(12) United States Patent
Camilleri

(10) Patent No.: US 11,400,517 B2
(45) Date of Patent: Aug. 2, 2022

(54) METHOD OF 3D PRINTING

(71) Applicant: EFFUSIONTECH Pty Ltd, Bayview (AU)

(72) Inventor: Steven Peter Camilleri, Bayview (AU)

(73) Assignee: EFFUSIONTECH IP PTY. LTD., Dandenong (AU)

( * ) Notice: Subject to any disclaimer, the term of this patent is extended or adjusted under 35 U.S.C. 154(b) by 346 days.

(21) Appl. No.: 16/631,398

(22) PCT Filed: Aug. 1, 2018

(86) PCT No.: PCT/AU2018/050799
§ 371 (c)(1),
(2) Date: Jan. 15, 2020

(87) PCT Pub. No.: WO2019/023749
PCT Pub. Date: Feb. 7, 2019

(65) Prior Publication Data
US 2020/0215609 A1  Jul. 9, 2020

(30) Foreign Application Priority Data

Aug. 3, 2017  (AU) .................................. 2017903081

(51) Int. Cl.
| | |
|---|---|
| *B22F 10/20* | (2021.01) |
| *B22F 3/115* | (2006.01) |
| *B33Y 10/00* | (2015.01) |
| *B33Y 40/00* | (2020.01) |

(52) U.S. Cl.
CPC .............. *B22F 10/20* (2021.01); *B22F 3/115* (2013.01); *B33Y 10/00* (2014.12); *B33Y 40/00* (2014.12)

(58) Field of Classification Search
CPC .......... B22F 10/20; B22F 3/115; B33Y 10/00; B33Y 40/00
See application file for complete search history.

(56) References Cited

U.S. PATENT DOCUMENTS

| | | | |
|---|---|---|---|
| 7,073,561 B1 | 7/2006 | Henn | |
| 2015/0321217 A1* | 11/2015 | Nardi | C23C 24/04 118/308 |
| 2016/0095959 A1 | 4/2016 | Bonassar et al. | |
| 2017/0129172 A1* | 5/2017 | Waatti | B29D 35/122 |
| 2017/0217100 A1* | 8/2017 | Gardiner | B29C 64/209 |

FOREIGN PATENT DOCUMENTS

| | | |
|---|---|---|
| WO | 20150139094 A1 | 9/2015 |
| WO | 20150157816 A1 | 10/2015 |

\* cited by examiner

*Primary Examiner* — Anthony J Zimmer
*Assistant Examiner* — Ricardo D Morales
(74) *Attorney, Agent, or Firm* — Welsh Flaxman & Gitler LLC

(57) ABSTRACT

A method of 3D printing an item, includes printing part of the item in three dimensions on a substrate, reorienting the part with respect to holding means that holds the part or substrate, and printing a further part of the item in three dimensions on the first mentioned part.

12 Claims, 3 Drawing Sheets

METHOD OF 3D PRINTING

FIELD OF INVENTION

This invention relates to a method of producing items by way of 3D printing. In a preferred form the invention relates to minimising the need for support material in 3D printing.

BACKGROUND

Typically, a 3D printer creates an item by adding print material to a substrate in increments. Such printers may have a motion control system that is able to direct where the material is placed. The control system may be attached to either the print head (e.g. that part that dispenses spray material) or the substrate (e.g. which holds the part-formed item as it builds), or both. Generally, as the item builds there are various forces acting on it (e.g. gravity and inertial forces, etc.). Therefore, the print head and substrate usually need to be securely held, and the part-formed item held securely to the substrate.

The manner in which the substrate and print head are configured may restrict where print material can be added. For example, the print head cannot normally apply print material to the part-formed item by dispensing it through the substrate. Rather, the print material can only be applied to the open or exposed portions of the item as it forms. This can restrict the feasible range of geometries that are printable with a given printer.

It is also often necessary to supplement the substrate with support material to hold printed material as the print progresses, for example in cases where the item being created has significant cantilevered portions that would be prone to deformation under gravity. Generally, support material is mechanically removed from the finished item at the end of a print job. The hassle of removing support material, along with the cost of printing and discarding it, has led to a range of design philosophies intended to minimise the use of support material. In some situations, the support material is a dissolvable substance.

It is an object of a preferred embodiment of the invention to go at least some way towards addressing one or more of the above limitations. It should however be understood that the object of the invention per se is simply to provide a useful choice.

Therefore, any objects or advantages applicable to any preferred embodiments should not be seen as a limitation of the scope of claims expressed more broadly.

SUMMARY OF INVENTION

According to one aspect of the invention there is provided a method of 3D printing an item, comprising the steps:
a) printing part of the item in three dimensions on a substrate;
b) reorienting the part with respect to holding means that holds the part or substrate; and
c) printing a further part of the item in three dimensions on the first mentioned part.

Optionally step b) involves disengaging the first mentioned part from the substrate, reorienting that part, and then reengaging it with the substrate or engaging it with the holding means or another substrate.

Optionally the reorientation involves a change of 45°-180°.

Optionally the method is carried out without providing any support for the item as it forms, other than the first and/or second mentioned substrate.

Optionally the item is built up from print material sprayed from a spray head.

Optionally the print material is cold sprayed.

Optionally the spray head and/or at least the first mentioned substrate is/are moved under the influence of a computerised controller to facilitate targeted placement of the print material as a cold spray as the item is built up, such movement being guided by recorded geometry parameters for the item.

Optionally the geometry parameters notionally divide the item to be formed into distinct portions at least one of which is designated to be reoriented with respect to means that holds the part or the first mentioned substrate after it is printed.

Optionally the method is such that:
a) step b) involves disengaging the first mentioned part from the substrate, reorienting that part, and then reengaging it with the substrate or engaging it with the holding means or another substrate;
b) the reorientation involves a change of 45°-180°;
c) the method is carried out without providing any support for the item as it forms, other than the substrate or substrates;
d) the item is built up from print material cold sprayed from a spray head;
e) the spray head and/or the substrate or substrates is/are moved under the influence of a computerised controller to facilitate targeted placement of the print material as the item is built up, such movement being guided by recorded geometry parameters for the item; and
f) the geometry parameters notionally divide the item to be formed into distinct portions at least one of which is designated to be reoriented after it is printed.

Optionally disengaging the first mentioned part from the substrate is by flexing or shock-loading the substrate in a jig and causing it to fracture along an interface with the part.

Optionally one or both substrates is/are incorporated into the item.

Optionally the print material comprises one or more of:
ferrous alloy (eg steel);
powdered non-ferrous alloy; and
molten plastic filament.

DRAWINGS

Some preferred embodiments of the invention will now be described by way of example and with reference to the accompanying drawings of which:

Figure 3:
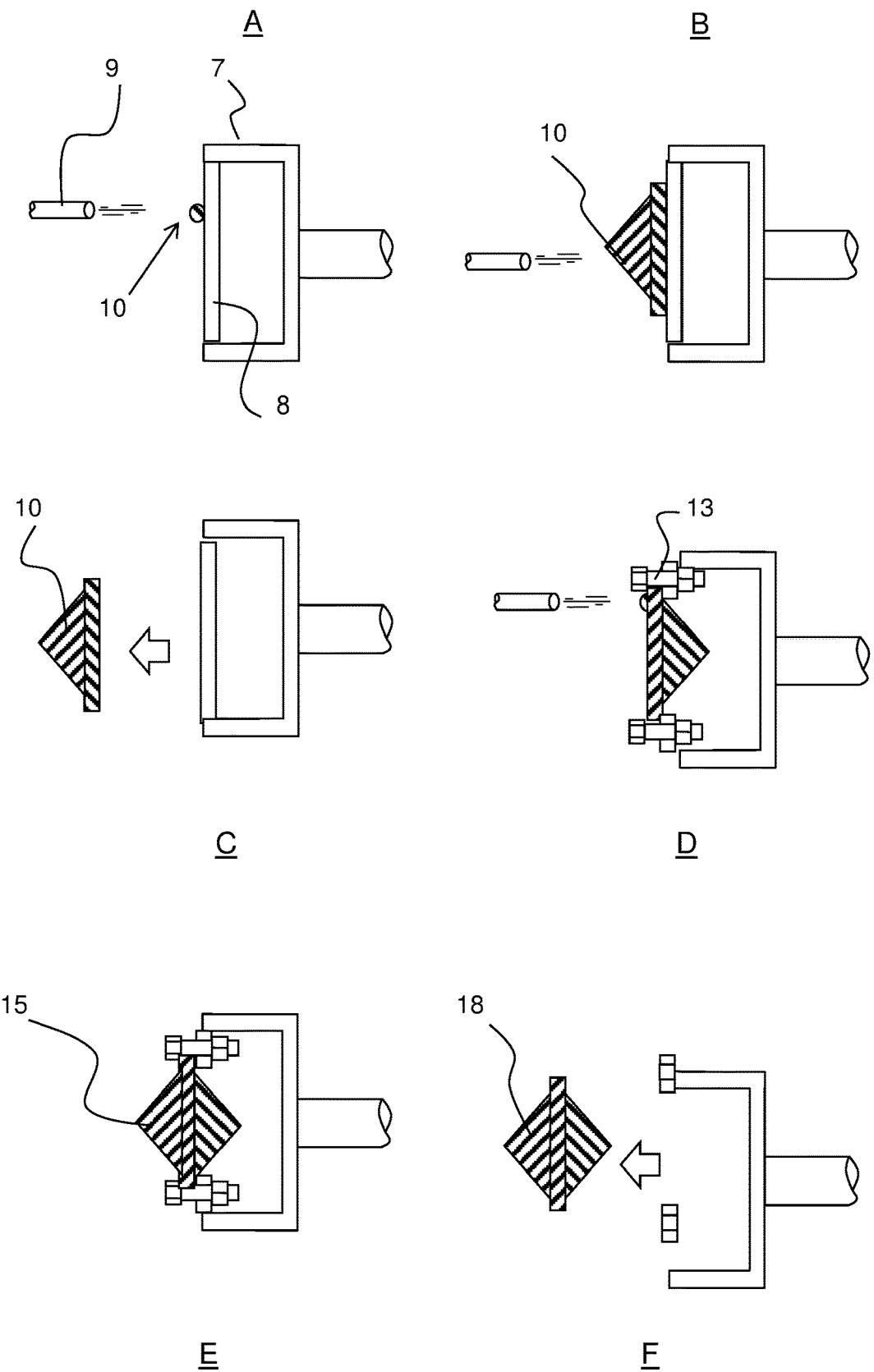
Figure 4:
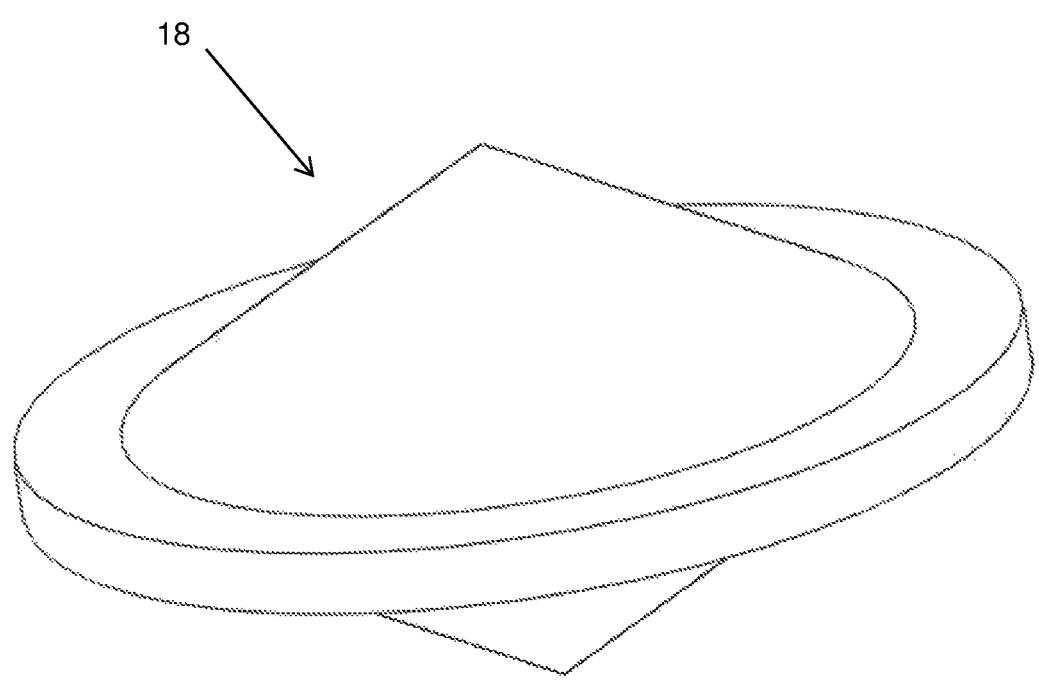

FIG. 3 schematically illustrates six steps in a 3D printing method according to an embodiment of the invention; and FIG. 4 is an isometric view of a finished item which is an optional product of the method of FIG. 3.

DETAILED DESCRIPTION

Figure 1:
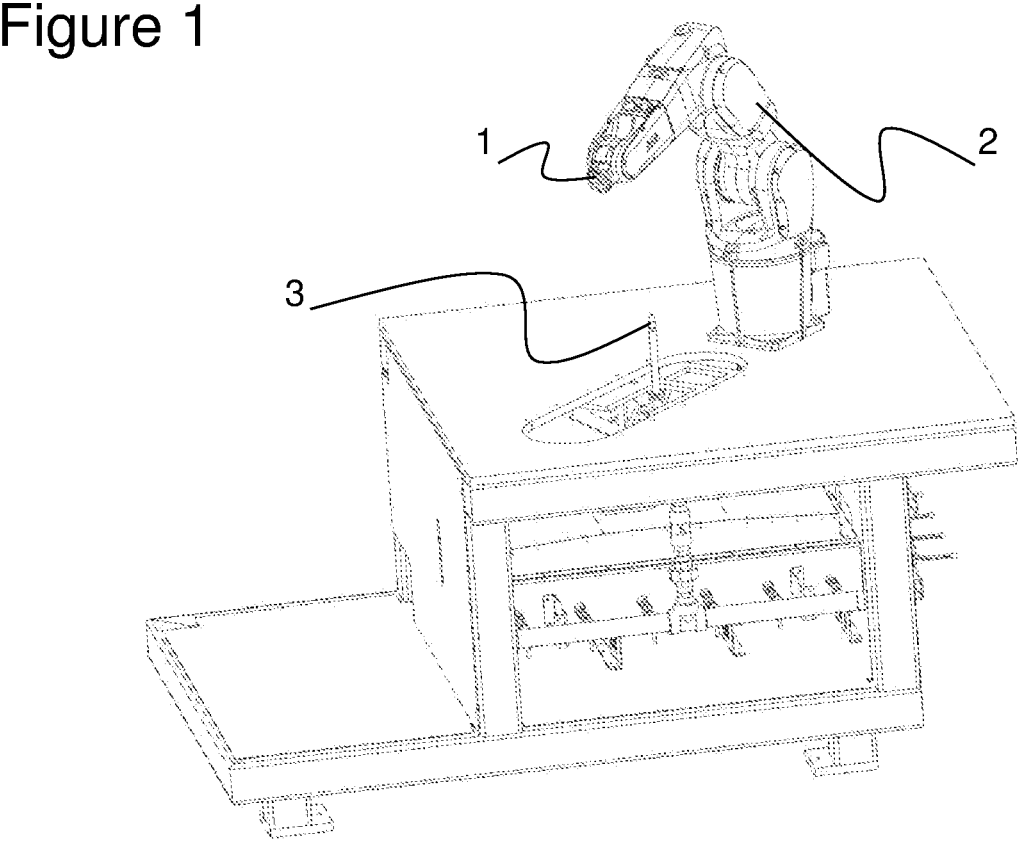
FIG. 1 is an isometric view of a 3D printer.
Figure 2:
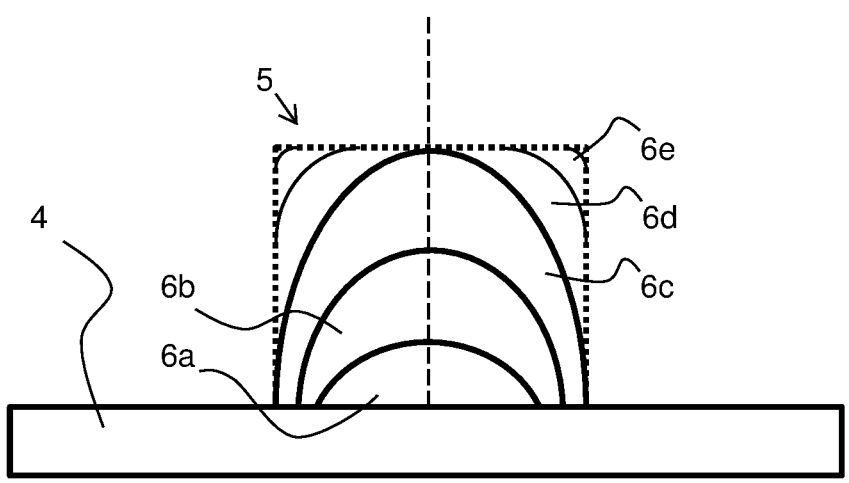
FIG. 2 is a schematic side view and an isometric 3D view of an item which has been 3D printed onto a substrate.

Referring to FIG. 1, this embodiment of a 3D printer comprises a grip 1 which incorporates a robotic arm 2 by which the grip can move. The printer also has a cold spray head 3. The grip 1 holds a substrate and exposes it to print material sprayed from the spray head 3 to build a 3D item on the substrate. The substrate 4 is shown in FIG. 2 with a 3D item 5 when built up from incremental layers 6 *a-e* of print material. The robotic arm 2 adjusts position and orientation as the item builds so that the print material is applied at the correct angle and to the right part of the substrate, or to the partially formed item, as the item builds.

As indicated, the substrate tends to block the print head from working on portions of the partially formed item—i.e. those faces that are held directly against the substrate. Also, applying spray material landing at too great a distance from the substrate without additional support can leave the material prone to deformation due to gravitational or other forces as it hardens. This may be addressed by creating the item in discrete portions. When one portion is printed it is removed from the substrate, reoriented, reengaged with the substrate, and a further portion is then incrementally built up on the first mentioned portion to complete the item. The finished item is then removed from the substrate. This building onto the completed first portion is distinguishable from fusing two ready-made portions.

Referring to FIG. 3, at step "A" a clamp 7 holds a blank substrate 8. A spray nozzle 9 is then controllably pointed at the substrate 8 and begins to form part 10 of a target three-dimensional item. A completed stage of the part 10 is indicated at step "B". As indicated at step "C" the part 10 is then removed from the substrate, a spacer 13 is fitted to the clamp as shown for step "D", the part is attached to the spacer upside down and spraying continues to form the opposite side 15 of the item as shown at step "E", resulting in the completed item 18, sprayed from both sides with no support material, as shown at "F". The item 18 is then released from the spacer. The final produced item is shown in three dimensions at FIG. 4.

Movement of the grip 1 (and therefore movement of the substrate), and/or movement of the spray head 3, is controlled by a computerised controller (not shown). The controller is programmed with geometry parameters for the item to be created and causes print material to issue from the spray head to contact the substrate or the partially formed item at the correct angle, speed and temperature for an optimum result. The geometry parameters notionally divide the item into the discrete portions and each part may terminate with a planar or non-planar face. By way of example, the faces may be vertically oriented, but for alternative items they may be horizontal or somewhere between horizontal and vertical. Preferably the faces face one another in the finished item.

While FIG. 3 illustrates creation of the finished item 18 in two discrete portions, in other embodiments there may be any plurality of portions, each the same, similar or significantly different in shape.

A benefit of some embodiments of the invention is that items can be readily created in stages without, or with substantially reduced, requirement for support material. The absence of support material (i.e. over and above the substrate) also means that items can be produced without the need to remove support after the event, eg to create cavities post printing.

As above, and with reference to FIG. 3, the first half of the item, when made, may be removed from the substrate, reoriented and then reengaged with the clamp 7 or substrate 8. Release can be achieved by flexing or shock-loading the substrate in a jig and causing it to fracture along the interface with the part. Alternately, the substrate may be incorporated into the item. Re-clamping can be achieved by incorporating reversible clamping features and locating surfaces on the sprayed part, such as flats areas, lugs or bolt faces. These features can be engaged by any conventional or convenient machining fixtures, such as bolts, finger clamps, toggle clamps or energised clamps and fixtures. Reliefs may be incorporated in the substrate face.

The print material has been described above as a spray. Examples of the sort of material that can be used for this are powdered alloys of non-ferrous metals such as aluminium 7075 or manganese bronze, or powdered steels such as 316 stainless steel. A particularly preferred material is Valimet 6061 applied as a cold spray at a temperature of 500° C. and a velocity of 700 m/s In other embodiments of the invention the print material may be applied as a molten plastic filament, such as used in Fused Deposition Melding (FDM). In such cases the print material may be ABS polymer.

In the case of cold spray deposition it has been found that once the part 10 is reoriented, the subsequent spray material can be best bonded if the newly presented deposition surface has been machined and polished, preferably to a mirror finish, and the temperature increased as high as is feasible, generally to about 100° C. If these steps are taken then the bonding interface between reoriented/already deposited material, and newly deposited material, tends to have more tensile strength than otherwise, generally close to that of the material itself. However this step is not essential. Other 'surface preparation treatments' can be employed, such as surface pre-heating in the case of polymer 3D printing processes (eg FDM).

The preceding description and drawings illustrate a clamping feature for holding a 'flipped' part. In some instances it is desirable to add sacrificial removable printed material (eg tabs) to the part that is 'flipped' in order to simplify the process of clamping it once flipped. Printing parts in this manner may trade off or balance between the complexity of clamping fixtures versus the complexity of printed parts. In the case of 3D printing, where the total production volume may be one piece, it is often desirable to minimise complexity of clamping fixtures.

In some embodiments of the invention the spray material may be varied when the part is flipped. For example a portion of the part is printed, the part is flipped and re-mounted it, the spray material is changed to one with desirable different properties, and then printing is continued. Heatsinks are one application for this technique. In this regard aluminium has been found to have good properties for a heatsink and copper has good volume properties. It is possible to use the above technique(s) to manufacture hybrid heatsinks that take advantage of the properties of both, with flipping and material changes.

While some preferred forms of the invention have been described by way of example, it should be understood that modifications and improvements can occur without departing from the following claims.

The invention claimed is:

1. A method of 3D printing an item, comprising the steps:
   a) printing a first part of the item in three dimensions onto a substrate held by a holding means;
   b) disengaging the first part of the item and the substrate from the holding means, reorientating the first part of the item, and then reengaging the first part of the item to the holding means with or without the substrate; and
   c) printing a further part of the item in three dimensions on the first part of the item.

2. The method according to claim 1, wherein the reorientating the first part of the item involves a change of 45°-180°.

3. The method according to claim 1, wherein the reengaging the first part of the item with the holding means includes engaging the first part of the item with another substrate.

4. The method according to claim 1, wherein the item is built up from print material sprayed from a spray head.

5. The method according to claim 4, wherein the print material is cold sprayed.

6. The method according to claim 4, wherein the printing is via a spray head, and wherein the spray head and/or the substrate is moved under the influence of a computerised controller to facilitate targeted placement of the print material as a cold spray as the item is built up, such movement being guided by recorded geometry parameters for the item.

7. The method according to claim 6, wherein the geometry parameters notionally divide the item to be formed into distinct portions at least one of which is designated to be reoriented with respect to the holding means after the first part of the item is printed.

8. The method according to claim 1, wherein:
   a. the reorientating the first part of the item involves a change of 45°-180°;
   b. the method is carried out without providing any support for the item as it forms, other than the substrate;
   c. the item is built up from print material cold sprayed from a spray head;
   d. the spray head and/or the substrate are moved under the influence of a computerised controller to facilitate targeted placement of the print material as the item is built up, such movement being guided by recorded geometry parameters for the item; and
   e. the geometry parameters notionally divide the item to be formed into distinct portions at least one of which is designated to be reoriented after it is printed.

9. The method according to claim 1, wherein disengaging the first part of the item from the substrate is by flexing or shock-loading the substrate in a jig and causing it to fracture along an interface with the first part of the item.

10. The method according to claim 3, wherein one or both substrates is/are incorporated into the item.

11. The method according to claim 1, wherein the print material comprises one or more of:
   ferrous alloy;
   powdered non-ferrous alloy; and
   molten plastic filament.

12. A method of 3D printing an item, comprising the steps:
   a) printing a first part of the item in three dimensions on a substrate held by a holding means;
   b) disengaging the first part of the item and the substrate from the holding means, reorientating the first part of the item, and then reengaging the first part of the item to the holding means without the substrate; wherein the substrate is disengaged from the first part of the item by flexing or shock-loading the substrate in a jig and causing it to fracture along an interface with the first part of the item; and
   c) printing a further part of the item in three dimensions on the first part of the item.

* * * * *